E. J. BRADY.
ARTIFICIAL LIGHTING MEANS.
APPLICATION FILED OCT. 22, 1913.
1,122,065.  Patented Dec. 22, 1914.
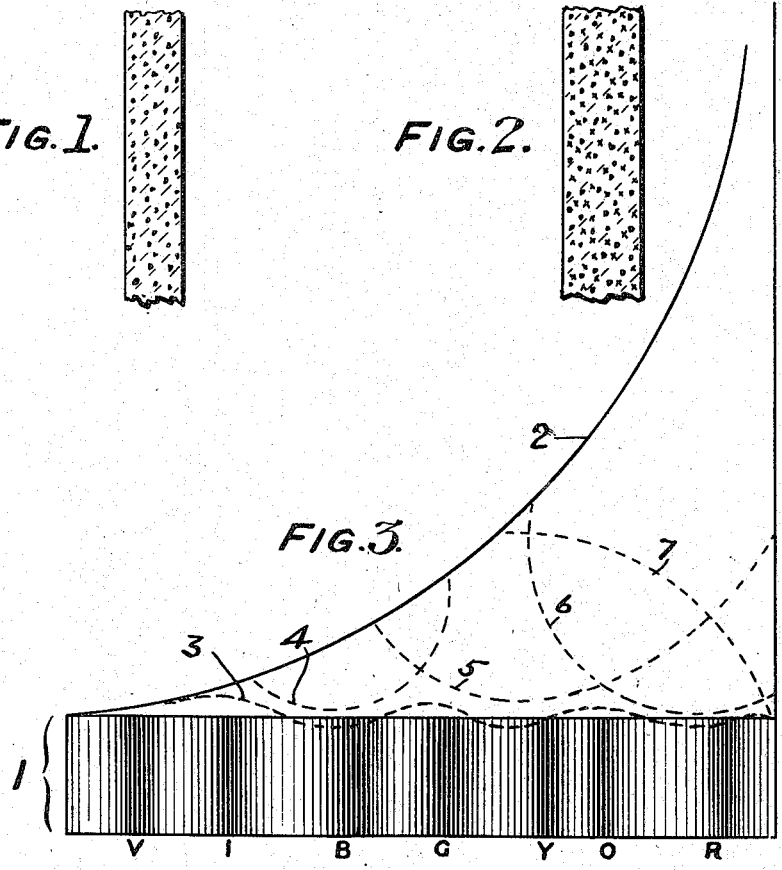
WITNESSES:
INVENTOR
Edward J. Brady
BY
Augustus B. Stoughton.
ATTORNEY ved that I, Edward J. Brady, a

UNITED STATES PATENT OFFICE.

EDWARD J. BRADY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

ARTIFICIAL-LIGHTING MEANS.

1,122,065.  Specification of Letters Patent.  Patented Dec. 22, 1914.

Application filed October 22, 1913. Serial No. 796,552.

*To all whom it may concern:*

Be it known that I, EDWARD J. BRADY, a citizen of the United States, and a resident of Philadelphia, in the county of Philadelphia and State of Pennsylvania, have invented certain new and useful Improvements in Artificial-Lighting Means, of which the following is a specification.

The invention relates to color filters or absorbing screens which operate to modify artificial light passing through them so as to produce a resultant illumination equivalent to daylight.

The principal object of the present invention is to provide an efficient color filter or absorbing screen which may be constructed wholly of glass and which may therefore assume various forms useful in the arts, such as bulbs for incandescent electric lights and shades of various kinds.

The invention will be claimed at the end hereof, but will be first described in connection with the accompanying drawings, in which—

Figure 1, is a transverse sectional view of a color filter or absorbing screen embodying features of the invention. Fig. 2, is a similar view illustrating a modification thereof, and Fig. 3, is a diagrammatic view hereinafter referred to for the sake of description.

Referring to the drawings and more particularly to Fig. 3, the rectangle 1 diagrammatically represents the spectrum of daylight; the letters V, I, B, G, Y, O and R, indicate the colors of that spectrum. The height of the rectangle represents the intensity of the various colors as present in the spectrum of daylight. The curved line 2 indicates the relative intensity of the various colors in the spectrum of the artificial light which it is desired to modify.

For the sake of illustration and explanation the spectrum of the artificial light source and the spectrum of the daylight source are drawn as of equal intensities at the extreme violet end. Artificial light sources as generically represented by the area included under the curve 2 are usually different from daylight in possessing an excess of the longer spectrum wave lengths, that is yellow, orange and red. An absorbing screen or color filter in order to alter an artificial light spectrum to that of daylight must absorb these excessive radiations. If the relative intensities of the different colors of the spectrum are plotted upon such a scale that the intensities of daylight and the artificial light sources are the same at the blue extremity of the spectrum, then the transmission of the absorbing screen must be as the reciprocal of the ratio at each color of the intensity of the artificial light spectrum to the daylight spectrum.

The color filter or absorbing screen is adapted by absorption to produce the above described result, or perhaps more accurately, a very close approximation to it. In Fig. 3, the approximation is indicated by the dotted line 3 and dotted lines 4, 5, 6, and 7, indicate the absorptions diagrammatically and separately. For example, the dotted line 7 indicates that red rays are absorbed from the artificial light, reducing it from the curve 2 to the line 7. Similarly the dotted lines 4, 5, and 6 represent other absorptions supplementary to the absorptions indicated by the line 7. The dotted line 3 indicates the net result of the various absorptions as has been stated.

In the present invention the color filter or absorbing screen is of signal green and purple color, with or without a blue color. There is nothing new about the signal green and purple color, but the point of the present invention is that the color filter or screen may consist of glass containing or embodying these colors and since it is of glass, is otherwise proper and effective for the purpose in hand, it can be used, for example, as the globe or bulb of an electric light and in that case there is provided a source of artificial illumination which has the effect of daylight, and such a source of artificial daylight illumination is so far as I know at present unknown.

I am, of course, aware of the fact that color screens or filters have been made or suggested but I do not believe that there ever existed a source of light such as an electric lamp in which the globe or bulb operated to make the electric lamp produce immediately and directly the effect of daylight illumination.

To produce glass of the requisite purple color, use is made of nickel which may be introduced as nickel oxid or salts and the use of this material for the purpose of making artificial daylight glass, I believe to be novel. It is well known that signal green glass can be produced by the use of copper and blue glass can be produced by the use of cobalt.

Referring to the drawings glass of purple color produced by the use of nickel and glass of signal green color mixed together are shown diagrammatically in Fig. 1, and the glass diagrammatically shown in Fig. 2 is the same, except that blue glass is added.

The absorbing function of the purple glass is diagrammatically illustrated in Fig. 3 by the line 5. By purple color is meant that color or colors which absorb the intermediate colors of the visible spectrum. The signal green absorbs the deep red rays from the artificial source, as is illustrated diagrammatically by the line 7 in Fig. 3.

By way of further description, and not limitation, it may be said that where potash lime glass is used the following proportions produce good results:

| | | |
|---|---|---|
| Sand | .208 | pounds. |
| Potassium carbonate | .091 | " |
| Calcium carbonate | .025 | " |
| Potassium nitrate | .0167 | " |

To a batch weighing one-third of a pound or 2,333 grains, four grains of black nickel oxid, $Ni_2O_3$, may be added to produce the required kind of purple glass. To a similar batch 15 grains of black copper oxid may be added to produce the signal green glass of required color. When this is done the glasses would be separate and could be intimately mixed. Instead of doing this the nickel oxid and the copper oxid in the quantity stated may be added to the batch of glass and in that case the result is the same and there is but one layer of glass. Oxid of cobalt may be added to a proper batch of glass, making material to produce blue glass, or the oxid of cobalt may be added along with the oxid of nickel and oxid of copper.

In giving proportions of the coloring materials it must be borne in mind that the proportions are not hard and fast, but are to be changed so as to produce the desired result from any artificial light under consideration, having regard to the thickness of the glass. This is well understood by those skilled in the art.

It will be obvious to those skilled in the art that modifications may be made in details without departing from the spirit of the invention, hence the same is not limited further than the prior state of the art may require.

What I claim is:

1. A color filter or absorbing screen for transforming the light of artificial illuminants to daylight character comprising a glass composition containing nickel, copper and cobalt and being of generally blue color when viewed by daylight.

2. A color filter or absorbing screen for transforming the light of artificial illuminants to daylight character comprising a potash glass composition containing nickel, copper and cobalt and being of generally blue color when viewed by daylight.

3. A color filter or absorbing screen for transforming the light of artificial illuminants to daylight character comprising a glass composition containing nickel and copper and being of generally blue color when viewed by daylight.

4. A color filter or absorbing screen for transforming the light of artificial illuminants to daylight character comprising a potash glass composition containing nickel and copper and being of generally blue color when viewed by daylight.

In testimony whereof I have hereunto signed my name.

EDWARD J. BRADY.

Witnesses:
CLIFFORD K. CASSEL,
FRANK E. FRENCH.